No. 747,140. PATENTED DEC. 15, 1903.
G. R. CLARKE.
FARM GATE.
APPLICATION FILED NOV. 15, 1902.
NO MODEL. 2 SHEETS—SHEET 1.
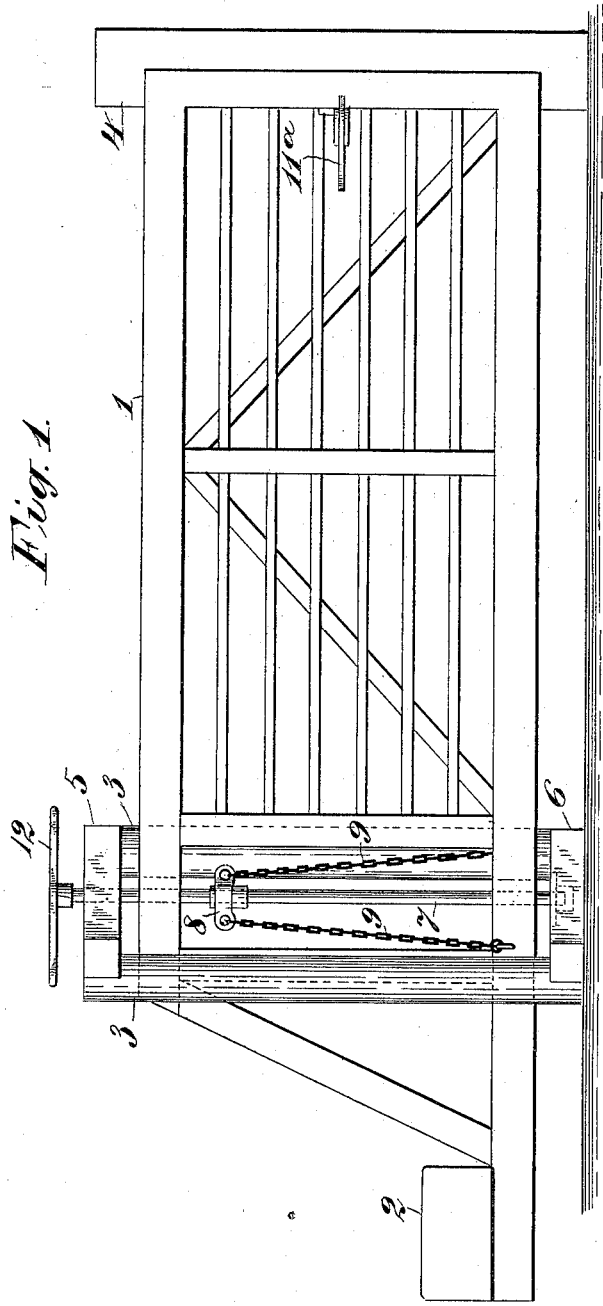
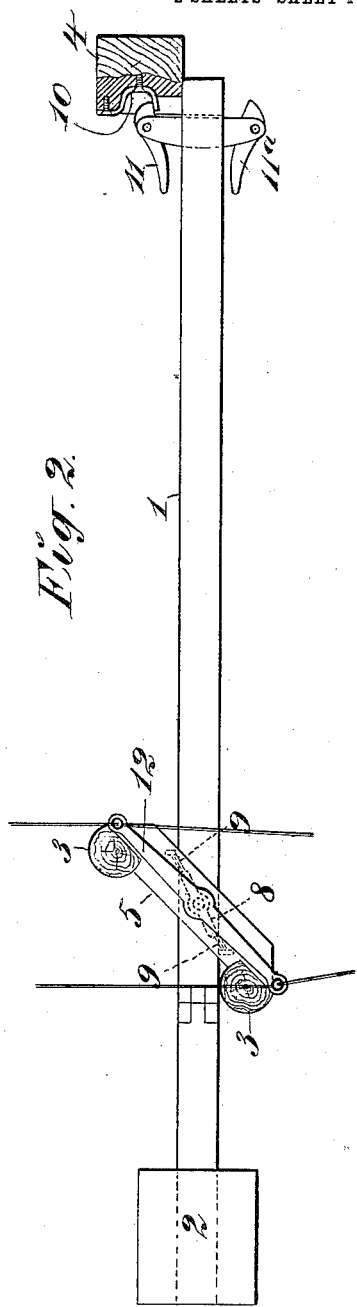
WITNESSES: INVENTOR
George R. Clarke
BY
ATTORNEY

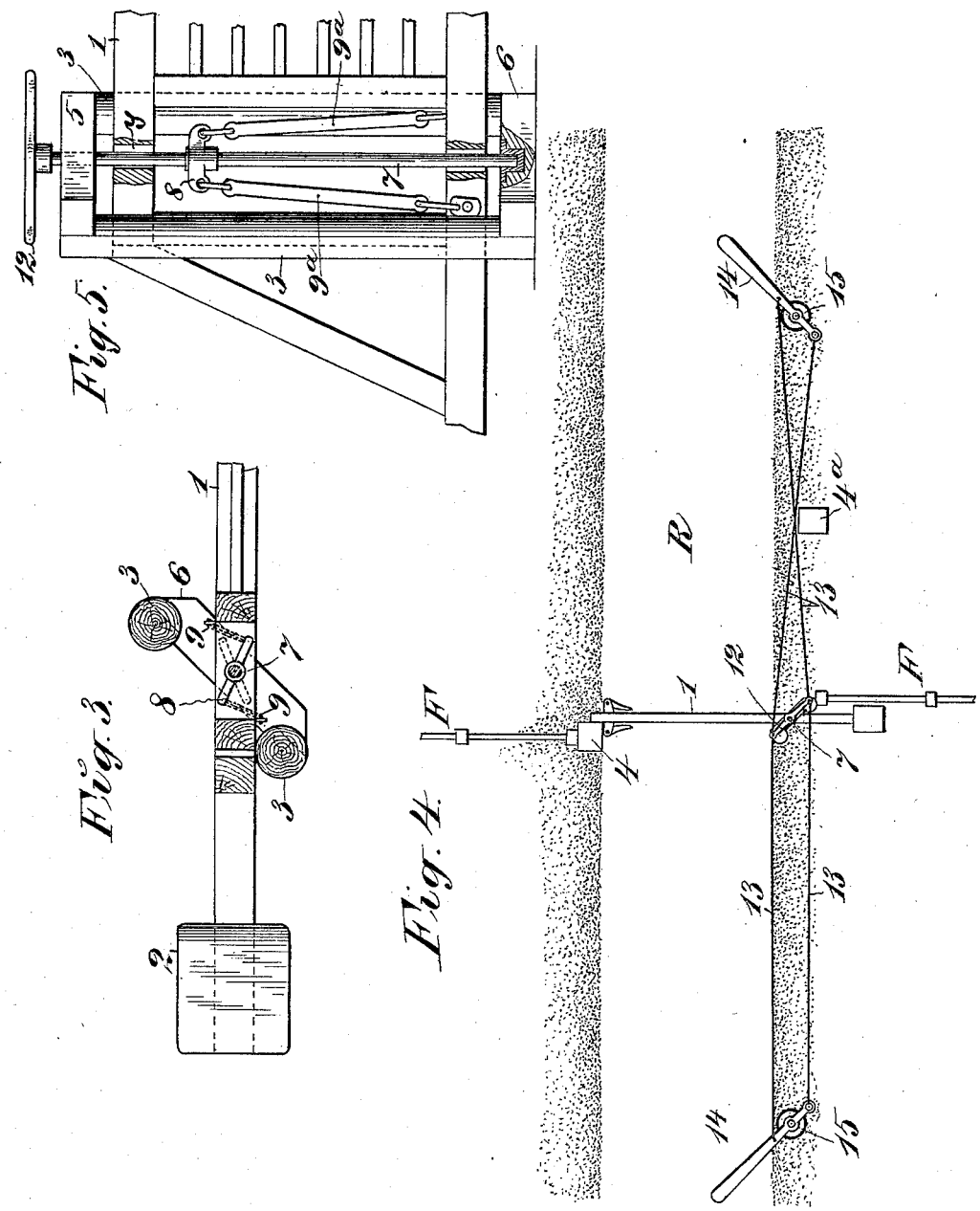

No. 747,140. Patented December 15, 1903.

UNITED STATES PATENT OFFICE.

GEORGE R. CLARKE, OF MONTEL, TEXAS.

FARM-GATE.

SPECIFICATION forming part of Letters Patent No. 747,140, dated December 15, 1903.

Application filed November 15, 1902. Serial No. 131,517. (No model.)

*To all whom it may concern:*

Be it known that I, GEORGE R. CLARKE, a citizen of the United States, residing at Montel, Uvalde county, Texas, have invented certain new and useful Improvements in Farm-Gates, of which the following is a specification.

This invention relates to the class of gates commonly used on farms and ranches through which roads pass and which may be opened and closed by any one riding or driving on the road without dismounting. Ordinarily such gates are adapted to be opened and closed through an operating-lever and suitable wires or connectors, the gate being by these means unlatched and thrown off its balance, so as to swing either to open or close by gravity. An example of this form of gate is shown in my Patent No. 687,198, dated April 8, 1902. In my present gate, however, the gate is counterweighted, so as to shift the center of gravity to the hinging-point, and suspended at this point by a plurality of flexible or flexibly-hung suspenders, and through the medium of an operating-arm or lever these suspenders are twisted about the hinging-axis of the gate, so as to first lift the gate and incidentally unlatch it and then cause it to swing open by the torsional effect due to twisting the flexible suspenders. The weight of the gate tends to untwist the suspenders, and thus swing the gate, which descends as it swings.

In the accompanying drawings, which serve to illustrate the invention, Figure 1 is a side elevation of the gate, and Fig. 2 is a plan of the same. These views show the parts quiescent. Fig. 3 is a fragmentary horizontal section showing the position when the chains are partly twisted through the operating means for unlatching and swinging the gate. Fig. 4 is a general plan view of the gate and roadway on a smaller scale. Fig. 5 is a view showing non-flexible but flexibly-connected suspenders for the gate.

1 designates the gate as a whole, and 2 the counterweight thereof.

3 designates the hinging-posts, and 4 the shut latching-post. Connecting the posts 3 are the upper bearing-piece 5 and the lower bearing-piece 6, in which is rotatively mounted an upright operating and hinging shaft 7. This shaft has fixed on it and forming a part of it a cross-piece 8, from the ends of which two flexible connectors or suspenders 9 extend down and are secured below to the gate. These suspenders are herein shown as chains, and they support or carry the gate, which is balanced by the counterweight 2, so that the point of suspension is at the center of gravity. A suitable catch 10 is provided, Fig. 2, at the latch-post 4 to be engaged by a latch 11, Fig. 2, on the free end of the gate, substantially as in my former patent or of any suitable form or construction.

In order to operate the gate, which turns or swings about the shaft 7, the latter extending through apertures in the upper and lower rails of the gate, the said shaft is turned in a manner to twist the two suspenders about the shaft. This has the effect to shorten them and lift the gate until the latch is free of the catch or lifted above the catch. The torsional strain will then swing the gate through a quarter-turn, the gate descending as it swings by the straightening or untwisting of the suspenders. When its free end reaches the other latching-post, a latch 11$^a$ thereon engages a catch on said post.

Referring now to Fig. 4, R designates a roadway, and F a fence-line crossing the same at the point where the gate is situated. In this view 4 is the latching-post for the closed gate, and 4$^a$ is the latching-post for the gate when open. On the upper end of the shaft 7 is secured an operating-bar 12, and from the ends of this bar wires 13 or the like extend in opposite directions, respectively, to operating-levers 14, mounted to turn on suitable posts 15, set at the side of the roadway R. These operating devices, whereby the shaft is turned, are the same or substantially the same as those shown in my previous patent and need not, therefore, be described more fully herein. The present invention is not limited to these specific operating means, and any others may be employed as well.

The suspenders 9 need not be and usually will not be actually brought into contact with each other or with the shaft 7 in the production of the torsional lifting effect on the gate, and by the words "twist" or "twisting" as herein employed is not meant the bringing of the suspenders in contact and winding each about the other or about the shaft forming the hinging-axis. Two or more suspenders may be employed, and they need not be flexible provided they are flexibly connected at their ends to the gate and bar or cross-piece 8, respectively.

Fig. 5 shows rigid suspenders 9ª, connected by links with the part 8 and the bottom rail of the gate. This figure also shows the slot-like or elongated aperture $y$ in the upper rail of the gate where the shaft 7 passes through. When the gate is opened by the turning of the shaft 7, the first effect is to slightly tilt the gate and elevate its latching end, and the elongation of the aperture $y$ permits this.

As will be seen in Figs. 3 and 4, the two hinging-posts 3 3, between which the gate is hung, are not set abreast and alined with the roadway, but both are set out of and at the side of the roadway and one nearer the road than the other, so that a vertical plane passing through the axes of the posts would be oblique to both the roadway and the gateway. This construction provides the proper room for the gate to swing in opening and closing. One of the posts 3 is set close to the terminal post of the fence F at that side of the road, so that the gate makes a complete closure, and the construction avoids all obstruction to the roadway by the counterbalance 2 and the hinging-posts, as these are wholly out of the roadway.

Having thus described my invention, I claim—

1. A farm-gate, in combination with means for operating same, said means comprising an upright, rotatable hinging-shaft about which the gate swings, a plurality of suspenders through which the gate is suspended from said shaft, and means for rotating said shaft and thereby operating said gate through the medium of said suspenders.

2. A farm-gate balanced at its hinging-point, in combination with means for operating same to open and close it, said means comprising an upright hinging-shaft about which the gate swings, a plurality of suspenders connected at their lower ends to the gate and at their upper ends to said shaft, said suspenders being uniformly disposed about said shaft, and means on the upper end of said shaft for rotating the same.

3. The combination with a gate, provided with latches to disengage by lifting and with a counterweight, of the latching-posts provided with catches, the hinging-posts and upper and lower bearing-pieces, the shaft 7 rotatively mounted in said bearing-pieces and provided with a cross-piece 8, the suspenders 9, attached at their upper ends to said cross-piece and at their lower ends to the gate, and the operating-bar 12, substantially as set forth.

4. The combination with the two posts 3, 3, set at the side of the roadway and one nearer thereto than the other, the bearing-pieces on said posts, the upright between said posts and mounted, in said bearing-pieces, and the cross-piece 8 secured to said upright between the bearing-pieces, of the gate mounted to turn about said upright and provided with a counterweight, the suspenders connected at their upper ends to said cross-piece and at their lower ends to the lower part of the gate, and the latching-post at the opposite side of the roadway from the posts 3.

In witness whereof I have hereunto signed my name, this 8th day of November, 1902, in the presence of two subscribing witnesses.

GEORGE R. CLARKE.

Witnesses:
T. W. ELLISON,
EDWARD O. STEVENS, Jr.